Patented May 22, 1934

1,959,352

UNITED STATES PATENT OFFICE 1,959,352

MANUFACTURE AND USE OF ORGANIC COMPOUNDS

George Holland Ellis, Henry Charles Olpin, and Ernest William Kirk, Spondon, near Derby, England, assignors to Celanese Corporation of America, a corporation of Delaware No Drawing. Application September 4, 1929, Serial No. 390,424. In Great Britain September 8, 1928

8 Claims. (Cl. 260—2)

This invention relates to the manufacture of new products particularly applicable as dispersing agents, more especially for the production of finely divided suspensions or dispersions of insoluble or difficulty soluble dyestuffs, and to the preparation of such dispersions and to the dyeing, printing, stencilling, or otherwise coloring therewith of materials made of or containing cellulose esters or cellulose ethers.

The present invention is concerned with the preparation and utilization of certain new water-soluble products which are particularly valuable as dispersing agents for insoluble or difficultly soluble compounds and as wetting agents.

According to the present invention the new compounds are obtained by interaction of an aromatic compound, whether carbocyclic or heterocyclic, a sulphonating agent, and a resin or a product derived therefrom, and may be termed resino-aromatic complexes. The three components, aromatic compound, resin and sulphonating agent may be caused to interact simultaneously or any two may be caused to interact and the product of such interaction allowed to react with the third component.

The manufacture of the new compounds is best effected by sulphonating an aromatic compound with sulphuric acid of suitable strength and then causing the product to react with a resin either in the same solution, if necessary after suitable adjustment of the concentration of the acid, or as a separate operation. The sulphonation of the aromatic compound may however be effected simultaneously with the reaction with the resin, for example, a mixture of an aromatic compound and a resin may be heated with a sulphonating agent.

As aromatic compounds which may be used according to the invention may be mentioned aromatic hydrocarbons or heterocyclic aromatic compounds, especially di- or poly-cyclic compounds, for example naphthalene, anthracene, or carbazole or crude products containing them, aromatic hydroxy compounds or crude products containing them, halogenated aromatic compounds, or the sulphonic acids of any of the aforementioned compounds but the invention is not restricted thereto.

The new products either in the form of the free acids or in the form of their alkali or ammonium salts are readily soluble in water yielding solutions of a colloidal nature and have been found to be valuable dispersing and wetting agents.

According to a further feature of the invention insoluble or difficultly soluble substances, for example insoluble or difficultly soluble organic compounds, particularly coloring matters, are prepared in dispersed form by treating them with an agent comprising one or more of the aforesaid new sulphonated resino-aromatic products or salts thereof.

The dispersion may be effected for example, by mixing or grinding the insoluble or difficultly soluble substance with the dispersing agent in the presence or absence of water or by forming, liberating, or precipitating them in the presence of the dispersing agent, whereby preparations in liquid, paste, solid or powdered form may be produced as required. The dispersing action may also be assisted by the application of heat. The aqueous preparations may if desired be treated for the removal of part or the whole of the water by evaporation or otherwise. Other protective colloids may be added to the preparations in order to increase their stability or for other purposes.

In some cases, and particularly when dispersions of insoluble organic compounds, for example insoluble coloring matters, are required, the dispersing action may be assisted by the addition of an auxiliary substance capable of exerting a solvent action on the compound to be dispersed, for instance, the auxiliary solvents specified in United States patent specification No. 1,690,481 and application No. 152,517 filed 3rd December, 1926 now Patent 1,803,008 in connection with insoluble or difficultly soluble coloring matters for cellulose acetate.

The new condensation products, as indicated above, are also applicable as wetting agents. They may for example be added to any liquids to facilitate the wetting of textile and other materials or substances therewith, or be mixed with dry powdered substances or the like to facilitate wetting, solution, dispersion, or the like on treatment with liquids.

The new dispersing and wetting agents, as compared with resin soaps, the use of which as dispersing agents for insoluble coloring matters for cellulose acetate is described in United States patent application S. No. 176,289 filed 17th March, 1927, have the advantage of better solubility and greater stability in the presence of acids or of calcium or other salts present in hard water. In the solid state the new condensation products form white to grey powders, and as previously indicated, dissolve in water yielding solutions of a colloidal nature.

Further, according to the invention, the coloration of materials made of or containing cellulose esters, for example cellulose acetate, or cellulose ethers, is effected by a process comprising the application thereto by dyeing, printing, stencilling or otherwise, of insoluble or difficultly soluble organic compounds or coloring matters which have affinity for cellulose esters or ethers and which have been converted into finely dispersed form by the new process, namely, by treatment with an agent comprising one or more of the aforesaid new sulphonated resino-aromatic products.

The dispersions of the organic compounds or coloring matters may be produced in the dyebaths, printing pastes, etc. themselves or may be prepared from more concentrated liquid, paste, solid, or powdered preparations containing the substances and dispersing agent by suitable dilution with water with or without addition of further quantities of dispersing agent and/or protective colloids.

Any insoluble or difficultly soluble coloring matter or organic compound having an affinity for the cellulose ester or ether material under treatment or capable of coloring the same may be utilized for the purpose of the present processes. In the case of dyeing by the azoic or development process, the base may be applied first diazotized on the material and developed, or the developer component may be applied first and the color formed by treatment with a suitable diazo-solution, or the base and developer components may be applied separately or together and the color produced by subsequent diazotization on the material. Either the base, or the developer, or both may be applied in the form of dispersions obtained with the aid of the new dispersing agents. As instances of suitable bodies may be mentioned the coloring matters or organic compounds or classes of coloring matters or compounds referred to in United States patent specifications Nos. 1,618,413, 1,545,819, 1,600,277, 1,641,965, 1,618,415, 1,694,414, and 1,679,935, United State patent application S. No. 98,614 filed 30th March 1926, and British Patents Nos. 239,470 and 283,081, the coloring matters of United States patent application S. No. 287,646 filed 22nd June, 1928 containing one or more keto-acidyl groups and particularly aceto-acetyl groups, the nitro-diarylamines specified in United States patent applications S. Nos. 311,252 and 311,253 both of 8th October, 1928, the unsulphonated thiazole derivatives of United States patent application S. No. 307,771 filed 22nd September, 1928, now Patent 1,871,673 the azo dyes containing the xanthene or thioxanthene nucleus of United States patent application S. No. 323,211 filed 1st December, 1928, and the azo dyes of United States patent application S. No. 297,098 filed 2nd August, 1928 containing the anthraquinone nucleus.

Though the process of the invention has been more particularly described with reference to the coloring of cellulose acetate it is also applicable to the coloration of materials made of or containing other cellulose esters such for example as cellulose formate, propionate, or butyrate, or the products obtained by the treatment of alkalized cellulose with esterifying agents (e. g. the product known as immunized cotton obtained by means of p-toluene-sulpho-chloride), or made of or containing cellulose ethers such as methyl, ethyl, or benzyl cellulose, or the corresponding condensation products of cellulose and glycols or other polyhydric alcohols. When the processes of the present invention are applied to the dyeing or otherwise coloring of mixed materials comprising in addition to cellulose acetate or other cellulose esters or ethers, fibres such as silk, wool, or cotton or other cellulosic fibres, natural or artificial, the said other fibres may be dyed with other dyestuffs before, after or together with the cellulose ester or ether portion and in the same or contrasting shades according to the choice of dyestuffs made and the affinity of the respective fibres therefor.

The following examples illustrate the invention but are not to be regarded as in any way limiting it:—

*Example 1*

500 parts of naphthalene are mixed with 500 parts of sulphuric acid monohydrate, and heated slowly to 160° C., and stirred at this temperature for 10 hours. The mixture is then allowed to cool to 60° C., and 200 parts of water are run in so slowly, that the temperature does not rise above 85° C. At this temperature 200 parts of resin (colophony) are slowly added, and when all is in and the frothing has subsided, the mixture is slowly heated to 100° C., and kept at this temperature for 6 to 8 hours. The batch is then cooled, diluted with 300 parts of water and partly neutralized with 200 parts of 40% caustic soda solution. A quantity of insoluble resinous matter agglomerates and is removed. A little salt is then added, when the product, hereinafter referred to as resino-naphthalene sulphonic acid, separates. The precipitate is filtered, washed with 10% brine, and dried. It is thus obtained as a light grey powder, easily and rapidly soluble in water. It has the further advantage of being readily obtained in a fine state of subdivision.

*Example 2*

500 parts benzene are heated with 1100 parts of 96% sulphuric acid and refluxed with stirring for 8 hours. The mixture is cooled to 50° C. and 50 parts of finely powdered resin are added in small portions and the temperature slowly raised to 100° C. and kept thereabouts for 6–8 hours. The batch is then poured on to 2500 parts of crushed ice and the resulting liquid filtered from a little resinous matter.

After allowing to cool the acid is partly neutralized with 1000 parts 30% caustic soda solution and about 500 parts salt added whereby the resino-benzene sulphonic acid separates out and after a time is filtered off, washed with brine and dried.

*Example 3*

500 parts phenol are sulphonated by heating with 1400 parts of sulphuric acid at 110° C. until a test portion is soluble in cold water. After cooling to 70–80° C. 50 parts of powdered resin are added and the mixture stirred on the water bath for two hours. The resulting mixture is then poured on to 3000 parts of ice, filtered and partly neutralized with 1000 parts of 30% caustic soda solution; 500 parts of salt added and stirred until cool, when the resino-phenol sulphonate separates as a grey powdery precipitate which is filtered, washed and dried.

Though specific reference has been made only to the use of resins in the process and to the introduction of sulphonic groups prior to or concurrently with the reaction between the resin and the aromatic compound it will be readily appreciated that the resins may be replaced by substances derived therefrom, for example products of hydrolysis, e. g. resin acids, or in some cases products of esterification, and that sulphonation may take place subsequently to the interaction between the resin or substance derived therefrom and the aromatic compound.

Other sulphonating agents may be employed in place of sulphuric acid for example, fuming sulphuric acid or chlor-sulphonic acid.

Example 4

To obtain a blue violet shade on 100 lbs. of cellulose acetate woven fabric, 1 lb. of 1-amino-4-methylaminoanthraquinone is ground with 3 lbs. of the dry sodium salt of resino-naphthalene sulphonic acid and well stirred into 10 gallons of boiling water. The dyestuff dispersion thus obtained is strained into a bath of 300 gallons of water in a suitable dyeing machine and the goods entered at 25–30° C. The temperature is raised over half an hour to 75° C. and the goods worked at this temperature for one hour. The goods are then carefully lifted, rinsed and dried or otherwise treated as requisite.

Example 5

To obtain a red shade on 10 lbs. of cellulose acetate yarn in hank form, 1½ ounces of 1-methylaminoanthraquinone are ground with 6 ounces of resino-naphthalene sodium sulphonate, and sufficient water to make a thin cream. This is well stirred into 30 gallons of water at 30–35° C. and the goods entered. The temperature is raised very slowly to 75–80° C. and the goods worked until the desired shade is attained. The hanks are then lifted, rinsed and dried, or treated in any other desired manner.

What we claim and desire to secure by Letters Patent is:—

1. Process of making water soluble sulphonated products comprising causing a sulphonating agent to act on an unsubstituted aromatic hydrocarbon and causing the sulphonated product to react with a natural resin.

2. Process of making water soluble sulphonated products comprising causing a sulphonating agent to act on an unsubstituted aromatic hydrocarbon and causing the sulphonated product to react with a natural resin in the sulphonation mixture.

3. Process of making water soluble sulphonated products comprising causing a sulphonating agent to act on naphthalene and causing the sulphonated product to react with a natural resin.

4. Process of making water soluble sulphonated products comprising causing a sulphonating agent to act on naphthalene and causing the sulphonated product to react with a natural resin in the sulphonation mixture.

5. Process of making water soluble sulphonated products comprising sulphonating an unsubstituted aromatic hydrocarbon, causing the sulphonated product to react with a natural resin and converting the reaction product into a water soluble salt.

6. Process of making water soluble sulphonated products comprising causing a sulphonating agent to act on an unsubstituted aromatic hydrocarbon and causing the sulphonated product to react with rosin.

7. Process of making water soluble sulphonated products comprising causing a sulphonating agent to act on naphthalene and causing the sulphonated product to react with rosin.

8. Process of making water soluble sulphonated products comprising sulphonating an unsubstituted arommatic hydrocarbon, causing the sulphonated product to react with rosin and converting the reaction product into a water soluble salt.

GEORGE HOLLAND ELLIS.
HENRY CHARLES OLPIN.
ERNEST WILLIAM KIRK.